US012087155B2

(12) United States Patent
Nishimura et al.

(10) Patent No.: US 12,087,155 B2
(45) **Date of Patent: *Sep. 10, 2024**

(54) ROUTE CONTROL DEVICE AND ROUTE CONTROL METHOD

(71) Applicant: TOYOTA JIDOSHA KABUSHIKI KAISHA, Toyota (JP)

(72) Inventors: Kazuya Nishimura, Anjo (JP); Yuko Mizuno, Nagoya (JP); Shin Sakurada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,578

(22) Filed: Sep. 28, 2023

(65) Prior Publication Data

US 2024/0021074 A1 Jan. 18, 2024

Related U.S. Application Data

(63) Continuation of application No. 17/660,281, filed on Apr. 22, 2022, now Pat. No. 11,810,453.

(30) Foreign Application Priority Data

Jun. 29, 2021 (JP) ................................ 2021-107937

(51) Int. Cl.
*G08G 1/005* (2006.01)

(52) U.S. Cl.
CPC .................................. *G08G 1/005* (2013.01)

(58) Field of Classification Search
None
See application file for complete search history.

(56) References Cited

U.S. PATENT DOCUMENTS 10,403,129 B1 * 9/2019 Suarez ..................... G08B 6/00
11,355,006 B1 * 6/2022 Cho ................. G08G 1/096716
2007/0233372 A1 * 10/2007 Matsunaga ............ G01C 21/26 701/431
2017/0337432 A1 * 11/2017 Maeda ................. G06V 20/588
2021/0300359 A1 * 9/2021 McGill ............ G08G 1/096725

FOREIGN PATENT DOCUMENTS

JP 2014225151 A 12/2014

* cited by examiner

*Primary Examiner* — John F Mortell
(74) *Attorney, Agent, or Firm* — Dickinson Wright, PLLC

(57) ABSTRACT

A route control device includes a control unit that sets an angle of a guideway for guiding a wheelchair user with respect to a roadway in accordance with a length of a waiting time for which a vehicle traveling on the roadway is kept waiting, when the wheelchair user who is about to cross the roadway is detected, and performs a control of displaying a pedestrian crossing including the guideway on the roadway.

20 Claims, 9 Drawing Sheets

ROUTE CONTROL DEVICE AND ROUTE CONTROL METHOD

CROSS-REFERENCE TO RELATED APPLICATION

This application is a continuation of U.S. patent application Ser. No. 17/660,281, filed Apr. 22, 2022, which claims priority to Japanese Patent Application No. 2021-107937 filed on Jun. 29, 2021, incorporated herein by reference in its entirety.

BACKGROUND

1. Technical Field

The present disclosure relates to a route control device and a route control method.

2. Description of Related Art

Japanese Unexamined Patent Application Publication No. 2014-225151 (JP 2014-225151 A) discloses a pedestrian crossing support device for providing a driver with information indicating that a pedestrian crosses a road.

SUMMARY

The technique described in JP 2014-225151 A is not intended to reduce a burden on a wheelchair user crossing a roadway.

An object of the present disclosure is to reduce a burden on a wheelchair user crossing a roadway.

A route control device according to the present disclosure includes a control unit that sets an angle of a guideway for guiding a wheelchair user with respect to a roadway in accordance with a length of a waiting time for which a vehicle traveling on the roadway is kept waiting, when the wheelchair user who is about to cross the roadway is detected, and performs a control of displaying a pedestrian crossing including the guideway on the roadway.

A route control method according to the present disclosure includes: setting, by a route control device, an angle of a guideway for guiding a wheelchair user with respect to a roadway in accordance with a length of a waiting time for which a vehicle traveling on the roadway is kept waiting, when the wheelchair user who is about to cross the roadway is detected; and performing, by the route control device, a control of displaying the pedestrian crossing including the guideway on the roadway.

According to the present disclosure, it is possible to reduce a burden on a wheelchair user crossing a roadway.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings.

In each drawing, the same or corresponding portions are denoted by the same reference signs. In the description of the present embodiment, omission or simplification will be made as appropriate for description of the same or corresponding components.

Figure 1:
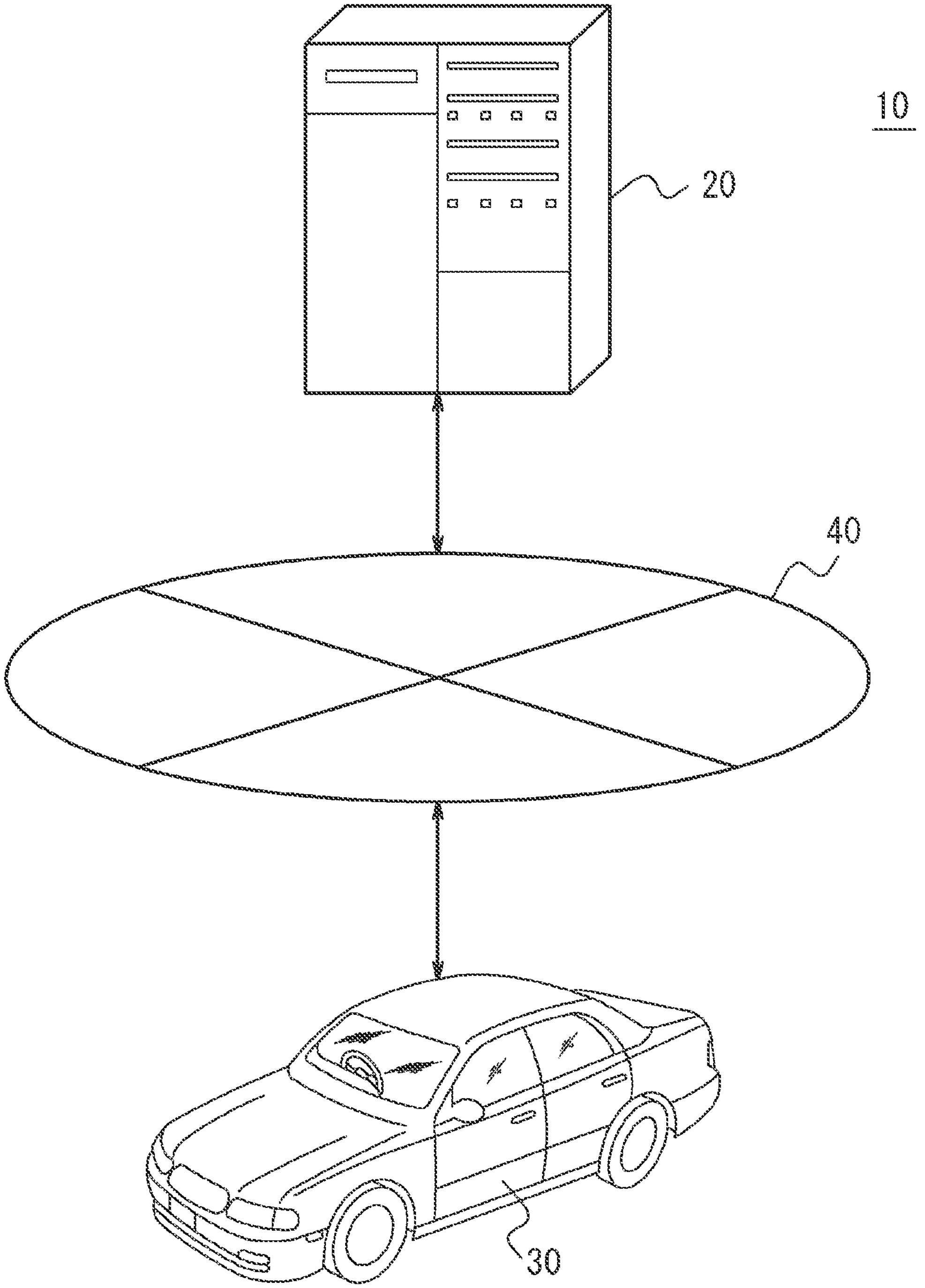
FIG. 1 is a block diagram showing a configuration of a system according to an embodiment of the present disclosure.

The configuration of a system 10 according to the present embodiment will be described with reference to FIG. 1.

The system 10 according to the present embodiment includes a route control device 20 and at least one vehicle 30. The route control device 20 can communicate with the vehicle 30 via a network 40.

The route control device 20 is installed in a facility. In the present embodiment, the route control device 20 is installed in a traffic control center that monitors traffic volume on the roadway, traveling speeds of vehicles on the roadway, pedestrians on the sidewalk, and the like, so as to perform a traffic control. The route control device 20 is a device that executes a control of displaying a pedestrian crossing at a point on the roadway on which a vehicle such as an automobile travels. The route control device 20 executes the control of displaying a pedestrian crossing based on information collected by any means such as a surveillance camera, a vehicle detector, a patrolling police car, or a helicopter. The route control device 20 is a computer such as a server belonging to a cloud computing system or other computing systems.

The vehicle 30 is a vehicle of any type, such as a gasoline vehicle, a diesel vehicle, a hydrogen vehicle, an HEV, a PHEV, a BEV, or an FCEV. The term "HEV" is an abbreviation for "hybrid electric vehicle". The term "PHEV" is an abbreviation for "plug-in hybrid electric vehicle". The term "BEV" is an abbreviation for "battery electric vehicle". The term "FCEV" is an abbreviation for "fuel cell electric vehicle". The vehicle 30 is driven by the driver in the present embodiment, but the driving may be automated at any level. The level of automation is, for example, one of levels 1 to 5 in the SAE leveling, for example. The term "SAE" is an abbreviation for the "Society of Automotive Engineers".

The vehicle may be a MaaS dedicated vehicle. The term "MaaS" is an abbreviation for "mobility as a service".

The network 40 includes the Internet, at least one WAN, at least one MAN, or any combination thereof. The term "WAN" is an abbreviation for "wide area network". The term "MAN" is an abbreviation for "metropolitan area network". The network 40 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation for "local area network".

The outline of the present embodiment will be described with reference to FIG. 2.

Triggered by detection that a pedestrian on a sidewalk SW is about to cross a roadway RW, the route control device 20 displays a pedestrian crossing CW including a guideway GW on the roadway RW for the detected pedestrian. While the pedestrian crossing CW including the guideway GW is displayed, the vehicle 30 traveling on the roadway RW waits in front of the pedestrian crossing CW. In the present embodiment, displaying the pedestrian crossing CW including the guideway GW on the roadway RW includes marking the pedestrian crossing CW including the guideway GW on the roadway RW.

When the pedestrian is a wheelchair user U1, it is conceivable to reduce the burden on the wheelchair user U1 by reducing an angle $\alpha$ for changing a direction from the traveling direction indicated by an arrow X in the drawing to the direction of crossing the roadway RW. Specifically, it is conceivable to set the angle $\alpha$ to 90° or less and display the guideway GW on the roadway RW such that the guideway GW extends diagonally forward with respect to the traveling direction of the wheelchair user U1. By doing so, as compared with the case where the guideway GW is displayed along the direction orthogonal to the traveling direction, the burden on the wheelchair user U1 when changing the direction is reduced. However, when the angle $\alpha$ of the guideway GW is reduced, the guideway GW becomes longer and the time required for crossing the roadway RW also becomes longer. As a result, the waiting time of the vehicle 30 becomes longer, and the traffic on the roadway RW may be excessively obstructed.

Therefore, in the present embodiment, the angle $\alpha$ of the guideway GW is set in accordance with the length of time for which the vehicle 30 can be kept waiting to the extent that the traffic on the roadway RW is not excessively obstructed. That is, when the wheelchair user U1 who is about to cross the roadway RW is detected, the route control device 20 sets the angle $\alpha$ of the guideway GW for guiding the wheelchair user U1 with respect to the roadway RW, in accordance with the length of the waiting time for which the vehicle 30 traveling on the roadway RW is kept waiting. The guideway GW is displayed on the roadway RW with the set angle $\alpha$.

According to the present embodiment, a display area of the pedestrian crossing CW can be changed in accordance with the length of the waiting time for which the vehicle 30 traveling on the roadway RW is kept waiting. Thus, the waiting time of the vehicle 30 and the crossing time of the wheelchair user U1 can be balanced, and the traffic on the roadway RW is not excessively obstructed. Further, since the guideway GW is displayed so as to extend diagonally forward with respect to the traveling direction of the wheelchair user U1, the burden on the wheelchair user U1 crossing the roadway RW can be reduced.

Figure 3:
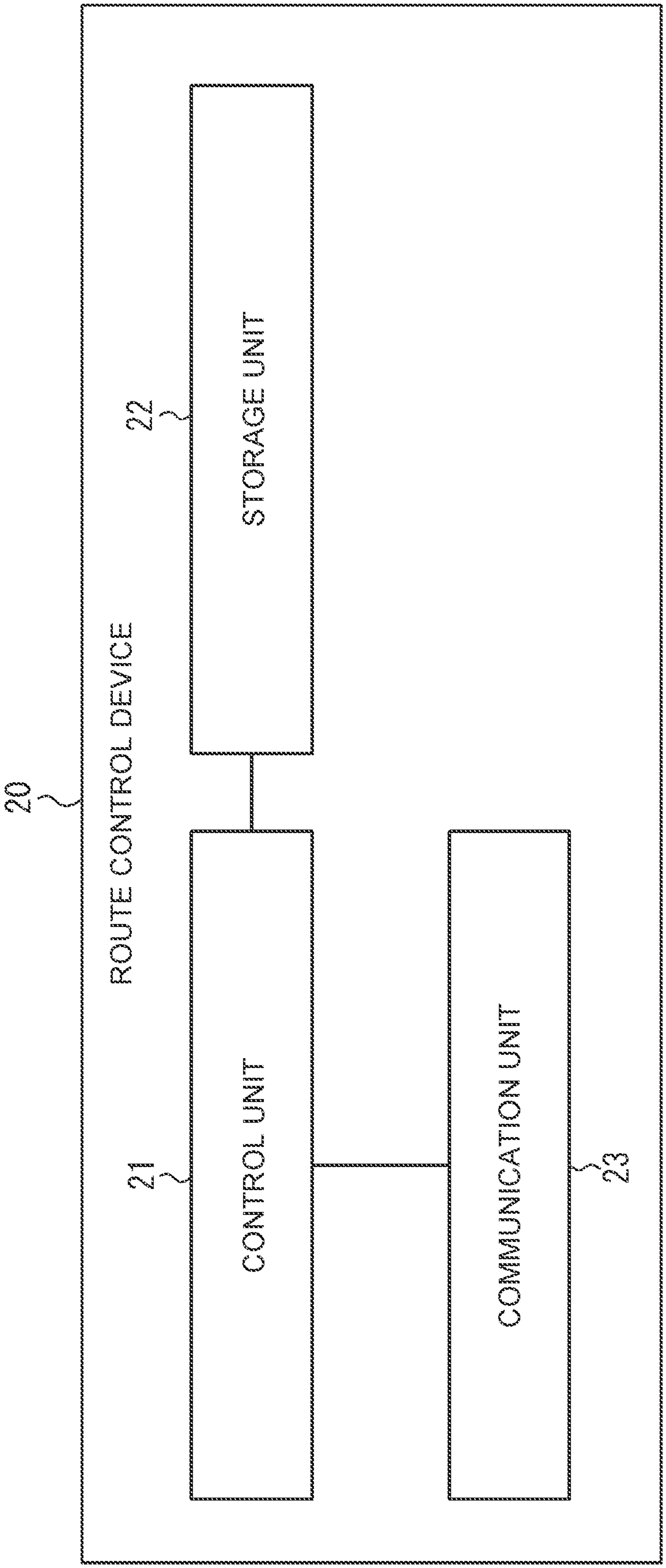
FIG. 3 is a block diagram showing a configuration of a route control device according to the embodiment of the present disclosure.

The configuration of the route control device 20 according to the present embodiment will be described with reference to FIG. 3.

The route control device 20 includes a control unit 21, a storage unit 22, and a communication unit 23.

The control unit 21 includes at least one processor, at least one programmable circuit, at least one dedicated circuit, or any combination thereof. The processor is a general-purpose processor such as a CPU or a GPU, or a dedicated processor specialized for a specific process. The term "CPU" is an abbreviation for "central processing unit". The term "GPU" is an abbreviation for "graphics processing unit". The programmable circuit is, for example, an FPGA. The term "FPGA" is an abbreviation for "field-programmable gate array". The dedicated circuit is, for example, an ASIC. The term "ASIC" is an abbreviation for "application specific integrated circuit". The control unit 21 executes processes related to the operation of the route control device 20 while controlling each unit of the route control device 20.

The storage unit 22 includes at least one semiconductor memory, at least one magnetic memory, at least one optical memory, or any combination thereof. The semiconductor memory is, for example, a RAM or a ROM. The term "RAM" is an abbreviation for "random access memory". The term "ROM" is an abbreviation for "read-only memory". The RAM is, for example, an SRAM or a DRAM. The term "SRAM" is an abbreviation for "static random access memory". The term "DRAM" is an abbreviation for "dynamic random access memory". The ROM is, for example, an EEPROM. The term "EEPROM" is an abbreviation for "electrically erasable programmable read-only memory". The storage unit 22 functions as, for example, a main storage device, an auxiliary storage device, or a cache memory. The storage unit 22 stores data used for the operation of the route control device 20 and data acquired through the operation of the route control device 20.

The communication unit 23 includes at least one communication interface. The communication interface is, for example, a LAN interface. The communication unit 23 receives the data used for the operation of the route control device 20, and transmits the data acquired through the operation of the route control device 20. In the present embodiment, the communication unit 23 communicates with the vehicle 30.

The function of the route control device 20 is realized by executing an information processing program according to the present embodiment with the processor serving as the control unit 21. That is, the function of the route control device 20 is realized by software. The information processing program causes the computer to perform the operation of the route control device 20 such that the computer functions as the route control device 20. That is, the computer functions as the route control device 20 by performing the operation of the route control device 20 in accordance with the information processing program.

The program can be stored in a non-transitory computer-readable medium. The non-transitory computer-readable medium is, for example, a flash memory, a magnetic recording device, an optical disc, an opto-magnetic recording medium, or a ROM. The distribution of the program is carried out, for example, by selling, transferring, or renting a portable medium such as an SD card, a DVD, or a CD-ROM in which the program is stored. The term "SD" is an abbreviation for "secure digital". The term "DVD" is an abbreviation for "digital versatile disc". The term "CD-ROM" is an abbreviation for "compact disc read-only memory". The program may be stored in the storage of the server and transferred from the server to other computers to distribute the program. The program may be provided as a program product.

The computer temporarily stores the program stored in the portable medium or the program transferred from the server in the main storage device, for example. The computer then causes the processor to read the program stored in the main storage device, and causes the processor to execute processes in accordance with the read program. The computer may read the program directly from the portable medium and execute processes in accordance with the program. The computer may execute the processes in accordance with the received program each time the program is transferred from the server to the computer. The processes may be executed by a so-called ASP service that realizes the function only by execution instruction and result acquisition without transferring the program from the server to the computer. The term "ASP" is an abbreviation for "application service provider". The program includes information that is used for processing by electronic computers and equivalent to a program. For example, data that is not a direct command to a computer but has the property of defining the processing of the computer corresponds to the "data equivalent to a program".

A part or all of the functions of the route control device 20 may be realized by a programmable circuit or a dedicated circuit serving as the control unit 21. That is, a part or all of the functions of the route control device 20 may be realized by hardware.

Figure 4:
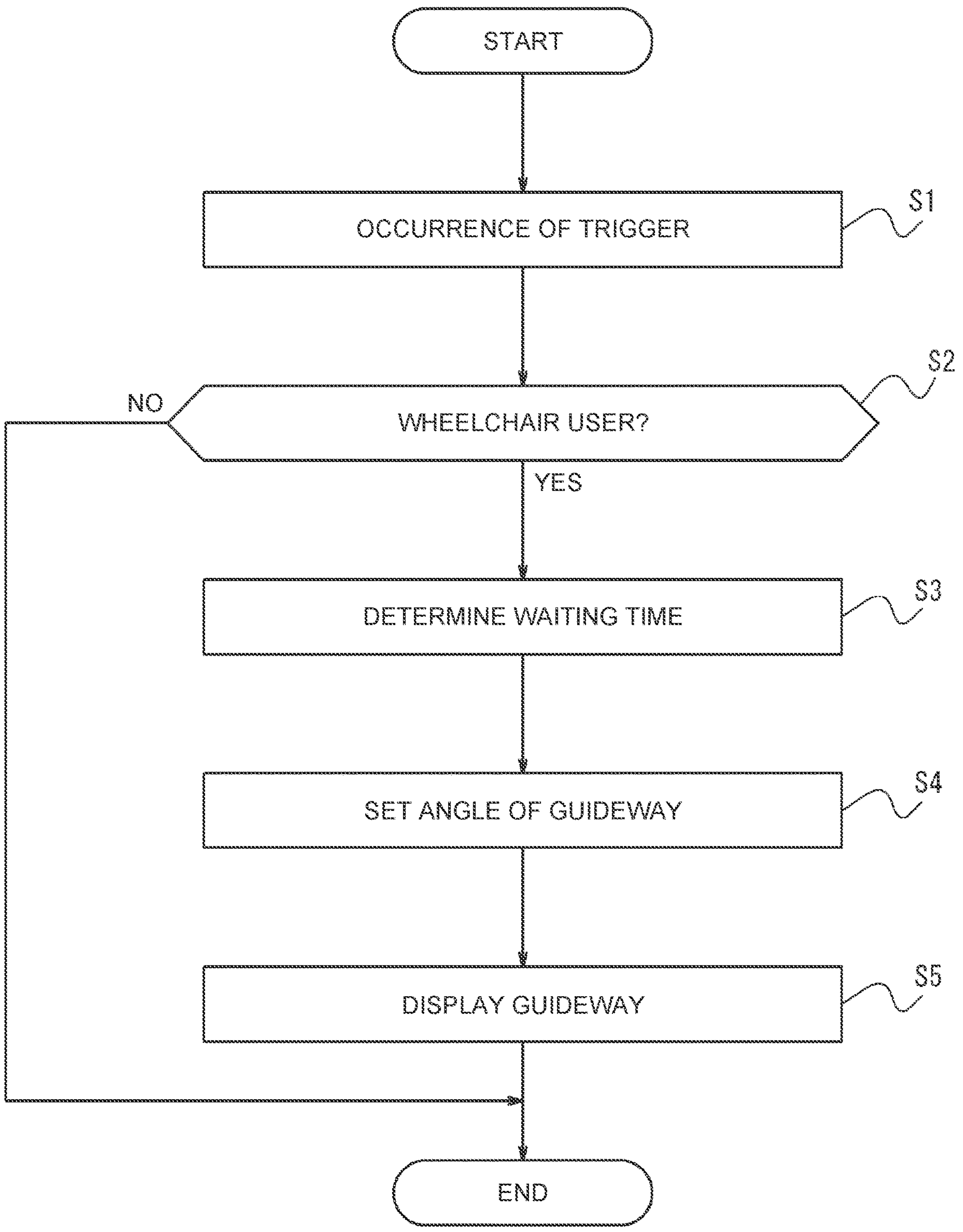
FIG. 4 is a flowchart showing an operation of the route control device according to the embodiment of the present disclosure.

The configuration of the system 10 according to the present embodiment will be described with reference to FIG. 4. The operation corresponds to the route control method according to the present embodiment.

In step S1, the control unit 21 of the route control device 20 detects a pedestrian who is about to cross the roadway RW. The detection of a pedestrian may be performed by any method. For example, the detection is performed by the following method. The control unit 21 receives a video captured by a sensor such as a surveillance camera installed on the sidewalk SW via the communication unit 23. The control unit 21 performs any image recognition processing such as object recognition or skeleton recognition on the received video to detect a pedestrian who is about to cross the roadway RW. Any method can be used to detect a pedestrian who is about to cross the roadway RW. For example, the control unit 16 may determine that there is a pedestrian who is about to cross the roadway RW when the pedestrian in the video performs a gesture such as raising his/her hand. Alternatively, the control unit 21 may detect a pedestrian by receiving a crossing request transmitted from a terminal T1 such as a smartphone of the pedestrian via the communication unit 23. Alternatively, the control unit 21 may detect a pedestrian who is about to cross the roadway RW by a plurality of load sensors provided in the sidewalk SW. That is, the control unit 21 may detect a pedestrian as the pedestrian who is about to cross the roadway RW when the load sensors detect that the pedestrian has stopped on the sidewalk SW.

In step S2, the control unit 21 of the route control device 20 determines whether the pedestrian detected in step S1 is the wheelchair user U1. Determination on whether the pedestrian is the wheelchair user U1 may be performed by any procedure, and for example, the determination is performed by the following procedure. The control unit 21 receives an image captured by a sensor such as a surveillance camera installed on the sidewalk SW via the communication unit 23. The control unit 21 analyzes the received image and determines whether the pedestrian in the image is the wheelchair user U1. Alternatively, the control unit 21 may refer to a pedestrian database indicating the attributes of one or more pedestrians including the detected pedestrian, and acquire information indicating the attributes of the detected pedestrian. In this case, the attributes of the pedestrian include information indicating whether the pedestrian is a wheelchair user. The pedestrian database may be stored in advance in the storage unit 22 of the route control device or may be stored in an external system. When it is determined in step S2 that the pedestrian is the wheelchair user U1, the process of step S3 is executed. When it is determined that the pedestrian is not the wheelchair user U1, the control unit 21 ends the process.

In step S3, the control unit 21 of the route control device 20 determines the length of the waiting time for which the vehicle 30 traveling on the roadway RW is kept waiting. The determination of the length of the waiting time may be performed by any procedure. In the present embodiment, the length of the waiting time is determined in advance for each of a plurality of roadways including the roadway RW. The control unit 21 refers to a waiting time database indicating the length of the waiting time defined for each of one or more roadways including the roadway RW to acquire the length of the waiting time defined for the roadway RW.

As a modification of the present embodiment, the control unit 21 of the route control device 20 may determine the length of the waiting time based on the traffic volume of the roadway RW. In this example, it is assumed that the length of the waiting time is determined in advance in correspondence with the traffic volume. Specifically, it is assumed that the larger the traffic volume is, the longer the waiting time is set. The control unit 21 calculates the traffic volume on the roadway RW by analyzing information collected by a surveillance camera, a vehicle detector, a patrolling police car, a helicopter, or the like. Alternatively, the control unit 21 may calculate the traffic volume on the roadway RW based on the traveling speed of the vehicle 30. This is because it is considered that the slower the traveling speed, the larger the traffic volume. The control unit 21 acquires the length of the waiting time corresponding to the calculated traffic volume.

In step S4, the control unit 21 of the route control device 20 sets the angle $\alpha$ of the guideway GW for guiding the wheelchair user U1 with respect to the roadway RW in accordance with the length of the waiting time acquired in step S3. Specifically, the control unit 21 sets the angle $\alpha$ of the guideway GW to be smaller as the waiting time increases. As an example, when the length of the waiting time is 30 seconds, the angle $\alpha$ is set to 45°. When the length of the waiting time is 20 seconds, the angle $\alpha$ is set to 60°. When the length of the waiting time is 10 seconds, the angle $\alpha$ is set to 75°. As an example, it is assumed that the length of the waiting time acquired in step S3 is 30 seconds. In this case, the control unit 21 sets the angle $\alpha$ to 45°.

In the present embodiment, when the roadway RW is located on the right side with respect to the traveling direction of the wheelchair user U1, the control unit 21 of the route control device 20 sets the angle $\alpha$ within the range of more than 0° to 90° or less clockwise with the azimuth angle of the traveling direction set to 0°. Specifically, when the wheelchair user U1 is traveling while seeing the roadway RW to the right, the control unit 21 causes the guideway GW to be displayed in the diagonally right hand direction in front of the wheelchair user U1. On the other hand, when the roadway RW is located on the left side with respect to the traveling direction of the wheelchair user U1, the control unit 21 sets the angle α within the range of more than 0° to 90° or less counterclockwise with the azimuth angle of the traveling direction set to 0°. Specifically, when the wheelchair user U1 is traveling while seeing the roadway RW to the left, the control unit 21 causes the guideway GW to be displayed in the diagonally left hand direction in front of the wheelchair user U1.

As a modification of the present embodiment, the control unit 21 of the route control device 20 may set the angle α further in accordance with the moving speed of the wheelchair user U1. Specifically, the control unit 21 sets the angle α even larger when the moving speed of the wheelchair user U1 is less than a threshold value. When the angle α of the guideway GW is increased, the length of the guideway GW can be shortened accordingly. This is because when the length of the guideway GW is shortened, the wheelchair user U1 can complete crossing the guideway GW within the waiting time of the vehicle 30 even if the moving speed of the wheelchair user U1 is less than the threshold value. The threshold value may be any value, and in this example, the threshold value is set to 1 m/s that is the moving speed of a general pedestrian. Information indicating the moving speed of the wheelchair user U1 may be acquired by any procedure. For example, the information is acquired by the following procedure. The control unit 21 of the route control device 20 communicates with the terminal T1 such as a smartphone of the wheelchair user U1 via the communication unit 23. The control unit 21 acquires the information indicating the moving speed measured by the terminal T1 as the information indicating the moving speed of the wheelchair user U1. When the moving speed of the wheelchair user U1 indicated by the acquired information is less than 1 m/s, the control unit 21 sets the angle α even larger. The control unit 21 multiplies the coefficient corresponding to the ratio of the moving speed of the wheelchair user U1 to the moving speed of a general pedestrian by the value of the angle α set in accordance with the length of the waiting time, so as to set the angle α even larger. The coefficient may be any value. As an example, the coefficient is set, in a stepwise manner, to 1.3 when the moving speed of the wheelchair user U1 is 0.8 m/s or more and less than 1 m/s, to 1.5 when the moving speed of the wheelchair user U1 is 0.5 m/s or more and less than 0.8 m/s, and so forth. As an example, it is assumed that the moving speed of the wheelchair user U1 is 0.8 m/s. Further, it is assumed that the value of the angle α set in accordance with the length of the waiting time is 45°. In this case, the control unit 21 sets, as the angle α, 58.5° that is a value obtained by multiplying 45° that is a value set in accordance with the length of the waiting time, by the coefficient 1.3.

As a modification of the present embodiment, the control unit 21 of the route control device 20 may set the angle α further in accordance with the width of the roadway RW. Specifically, the control unit 21 sets the angle α even smaller when the width of the roadway RW is narrower than a threshold value. The threshold value may be any value. In this example, the threshold value is set to 20 m. Information indicating the width of the roadway RW may be acquired by any procedure. For example, the information is acquired by the following procedure. The control unit 21 of the route control device 20 receives an image captured by a sensor such as a surveillance camera installed on the roadway RW via the communication unit 23. The control unit 21 analyzes the received image to calculate the width of the roadway RW, and acquires the calculated value as the information indicating the width of the roadway RW. When the width of the roadway RW indicated by the acquired information is less than 20 m, the control unit 21 sets the angle α even smaller. The control unit 21 sets the angle α even smaller by multiplying the coefficient corresponding to the width of the roadway RW by the value of the angle α set in accordance with the length of the waiting time. The coefficient may be any value. As an example, the coefficient is set, in a stepwise manner, to 0.5 when the width of the roadway RW is less than 10 m, to 0.8 when the width of the roadway RW is 10 m or more and less than 20 m, and so forth. As an example, it is assumed that the width of the roadway RW is 10 m. In this case, the control unit 21 sets, as the angle α, 36° that is a value obtained by multiplying 45° that is the angle α set in accordance with the length of the waiting time, by the coefficient 0.8.

In step S5, the control unit 21 of the route control device 20 performs the control of displaying the pedestrian crossing CW including the guideway GW on the roadway RW. The pedestrian crossing CW including the guideway GW may be displayed by any method. For example, the pedestrian crossing CW including the guideway GW is displayed by lighting light sources installed on the roadway RW. The light sources each include a light emitting element such as an LED or a laser diode. The term "LED" is an abbreviation for "light emitting diode". In the present embodiment, "lighting" is not limited to, for example, continuously lighting the light sources, and may include, for example, blinking the light sources in a predetermined cycle or pattern. Alternatively, the control unit 21 may cause the pedestrian crossing CW including the guideway GW to be displayed by irradiating the roadway RW with light from the irradiation device installed on the roadway RW.

Figure 2:
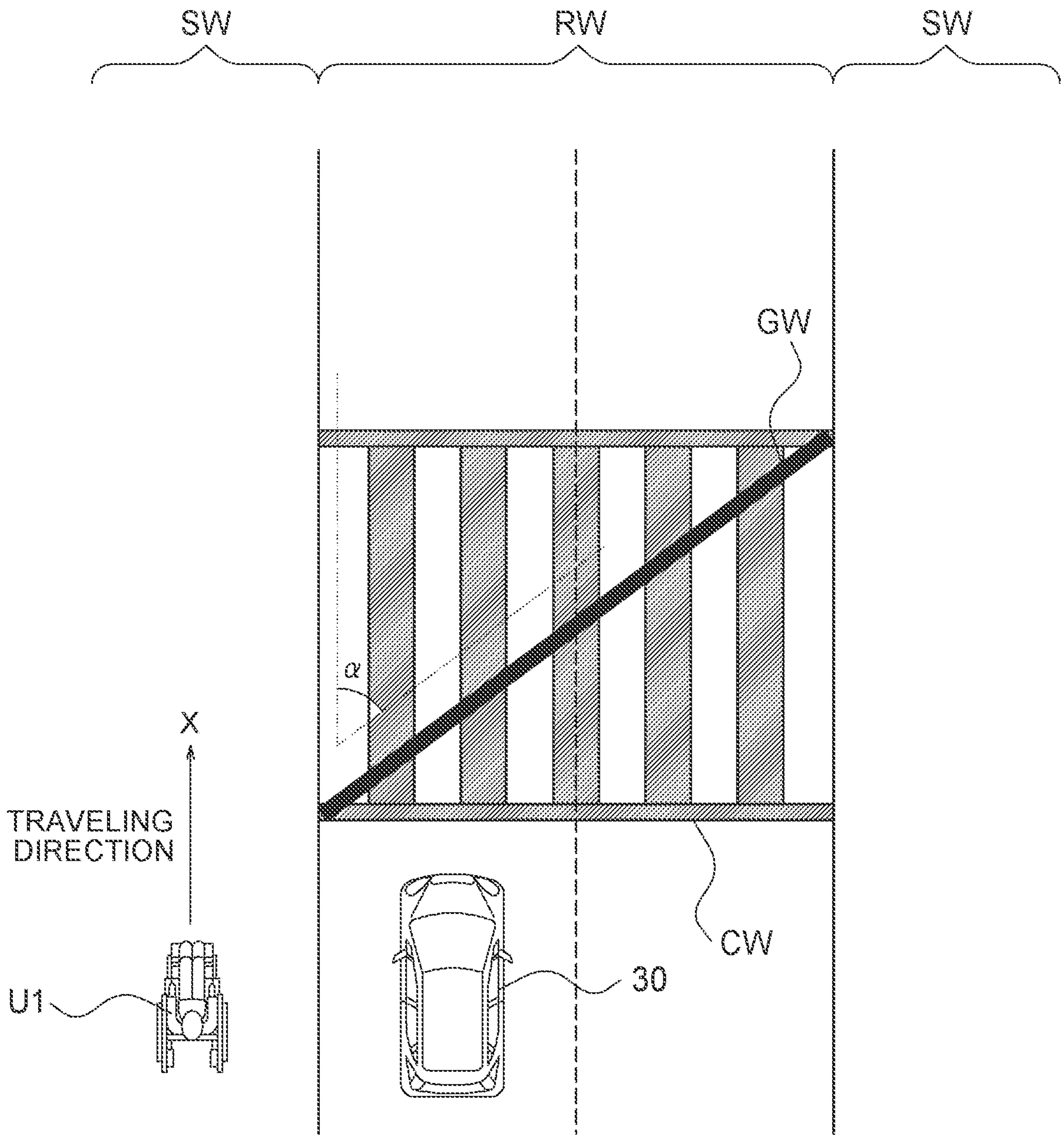
FIG. 2 is a schematic diagram showing a display example of a pedestrian crossing including a guideway according to the embodiment of the present disclosure.

FIG. 2 shows a display example of the pedestrian crossing CW including the guideway GW in the present embodiment. In this display example, the control unit 21 of the route control device 20 defines an area in which the guideway GW serves as a diagonal line, and performs a control of displaying the pedestrian crossing CW in the shape of the defined area. Specifically, the control unit 21 performs a control of displaying the pedestrian crossing CW in a rectangular area in which the start point and the end point of the guideway GW serve as opposite vertices. For example, the control unit 21 performs the control of displaying the pedestrian crossing CW by causing light sources on the display area of the pedestrian crossing CW, out of the light sources installed on the roadway RW, to emit light. Alternatively, the control unit 21 may perform the control of displaying the pedestrian crossing CW by causing light sources on the outer periphery of the display area of the pedestrian crossing CW, out of the light sources installed on the roadway RW, to emit light. In this example, as shown in FIG. 2, the display area of the pedestrian crossing CW is divided and lit in a striped pattern. The control unit 21 may perform the control of displaying the display area of the pedestrian crossing CW by irradiating the display area of the pedestrian crossing CW on the roadway RW with light from the irradiation device installed on the roadway RW.

As shown in FIG. 2, the control unit 21 further performs a control of displaying the shape of the guideway GW by superimposing the shape of the guideway GW on the pedestrian crossing CW. Specifically, the control unit 21 performs the control of displaying the guideway GW on the diagonal line on the display area of the pedestrian crossing CW. For example, the control unit 21 performs the control of displaying the guideway GW and the pedestrian crossing CW in different colors. That is, the control unit 21 performs the control of displaying the guideway GW on the display area of the pedestrian crossing CW by causing the light sources installed on the guideway GW to emit light in a color different from that of light emitted from the light sources installed in the display area of the pedestrian crossing CW. Alternatively, the control unit 21 may perform the control of displaying the guideway GW on the display area of the pedestrian crossing CW by irradiating, from the irradiation device installed on the roadway RW, the roadway RW with light having a color different from that of the light corresponding to the pedestrian crossing CW as the light corresponding to the guideway GW. As a result, as shown in FIG. 2, the shape of the guideway GW is displayed by being superimposed on the pedestrian crossing CW.

According to this example, the wheelchair user U1 can travel in a relatively wide area displayed as the pedestrian crossing CW when the wheelchair user U1 crosses the roadway RW. Therefore, the flexibility in selection of a route can be increased. Further, since the guideway GW that is the shortest distance in the display area of the pedestrian crossing CW is explicitly displayed, the wheelchair user U1 can easily select a route having a short time required for crossing. Therefore, the burden on the wheelchair user crossing the roadway is reduced.

Figure 5:
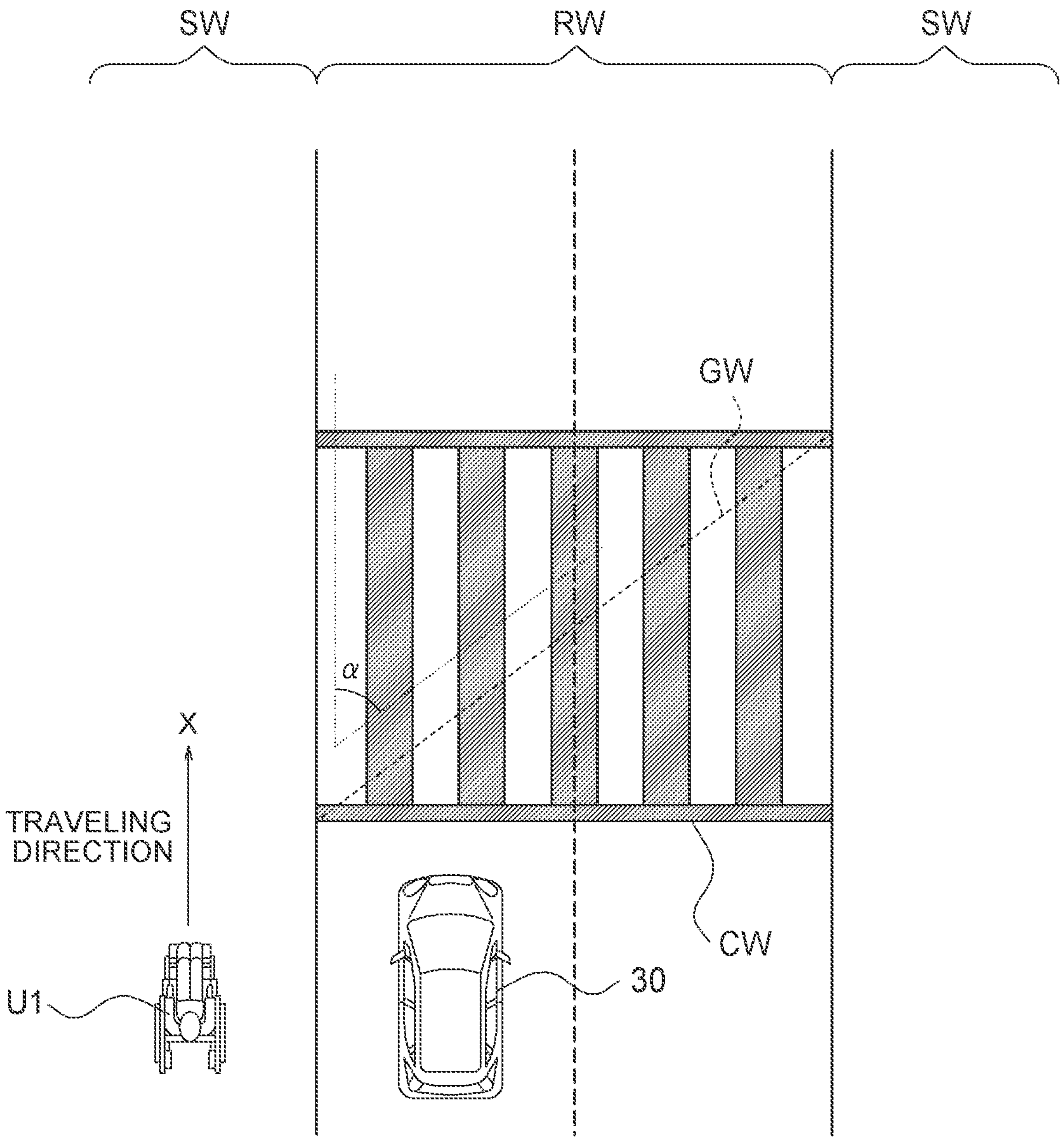
FIG. 5 is a schematic diagram showing another display example of the pedestrian crossing including the guideway according to the embodiment of the present disclosure.

In the display example shown in FIG. 2, an example in which the guideway GW is explicitly displayed has been described. However, instead of explicitly displaying the guideway GW, the control unit 21 of the route control device 20 may perform the control of displaying only the display area of the pedestrian crossing CW without displaying the guideway GW, as shown in FIG. 5. Specifically, the control unit 21 performs the control of displaying only the display area of the pedestrian crossing CW by causing only the light sources provided in the display area of the pedestrian crossing CW to emit light. The control unit 21 may perform the control of displaying only the pedestrian crossing CW by irradiating only the display area of the pedestrian crossing CW on the roadway RW with light from the irradiation device installed on the roadway RW. As a result, as shown in FIG. 5, only the display area of the pedestrian crossing CW is displayed.

According to this example, the wheelchair user U1 can travel in a relatively wide area displayed as the pedestrian crossing CW in which the guideway GW serves as a diagonal line when the wheelchair user U1 crosses the roadway RW. Therefore, it is possible to increase the flexibility in selection of a route that the wheelchair user can take when crossing a roadway.

Figure 6:
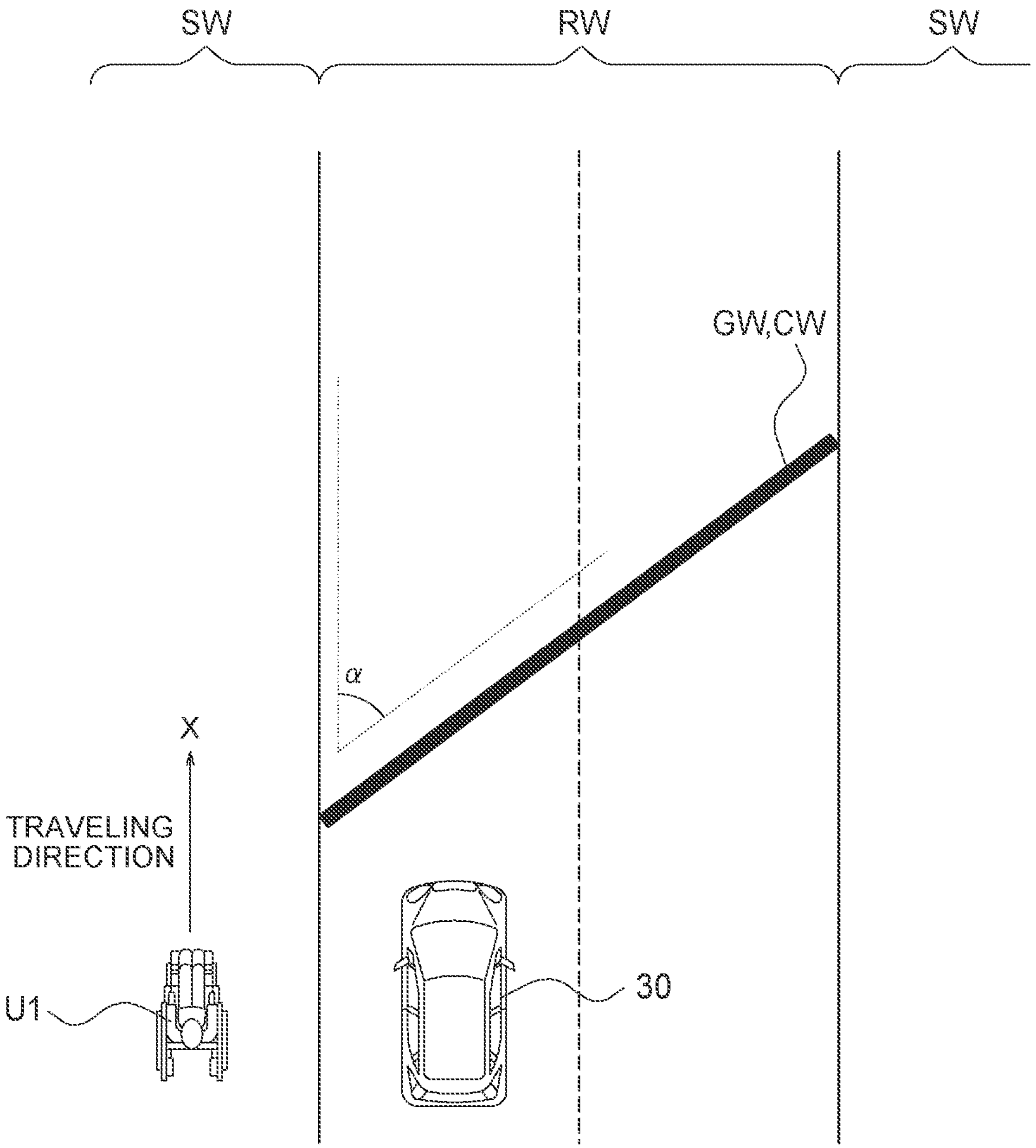
FIG. 6 is a schematic diagram showing yet another display example of the pedestrian crossing including the guideway according to the embodiment of the present disclosure.

FIG. 6 shows another display example of the pedestrian crossing CW and the guideway GW in the present embodiment. In this display example, the control unit 21 of the route control device 20 performs a control of displaying the pedestrian crossing CW in the shape of the guideway GW. Specifically, the control unit 21 performs the control of displaying the guideway GW as the pedestrian crossing CW. For example, the control unit 21 performs the control of displaying the guideway GW as the pedestrian crossing CW by causing only the light sources in the area corresponding to the shape of the guideway GW to emit light. Alternatively, the control unit 21 may perform the control of displaying the guideway GW as the pedestrian crossing CW by irradiating only the area corresponding to the shape of the guideway GW with light from the irradiation device installed on the roadway RW. As a result, as shown in FIG. 6, the pedestrian crossing CW including the guideway GW is displayed on the roadway RW in the shape of the guideway GW.

According to this example, the pedestrian crossing CW including the guideway GW is displayed in the same shape as the guideway GW so as to extend diagonally forward with respect to the traveling direction of the wheelchair user U1. Thus, the burden on the wheelchair user crossing the roadway is reduced.

Figure 7:
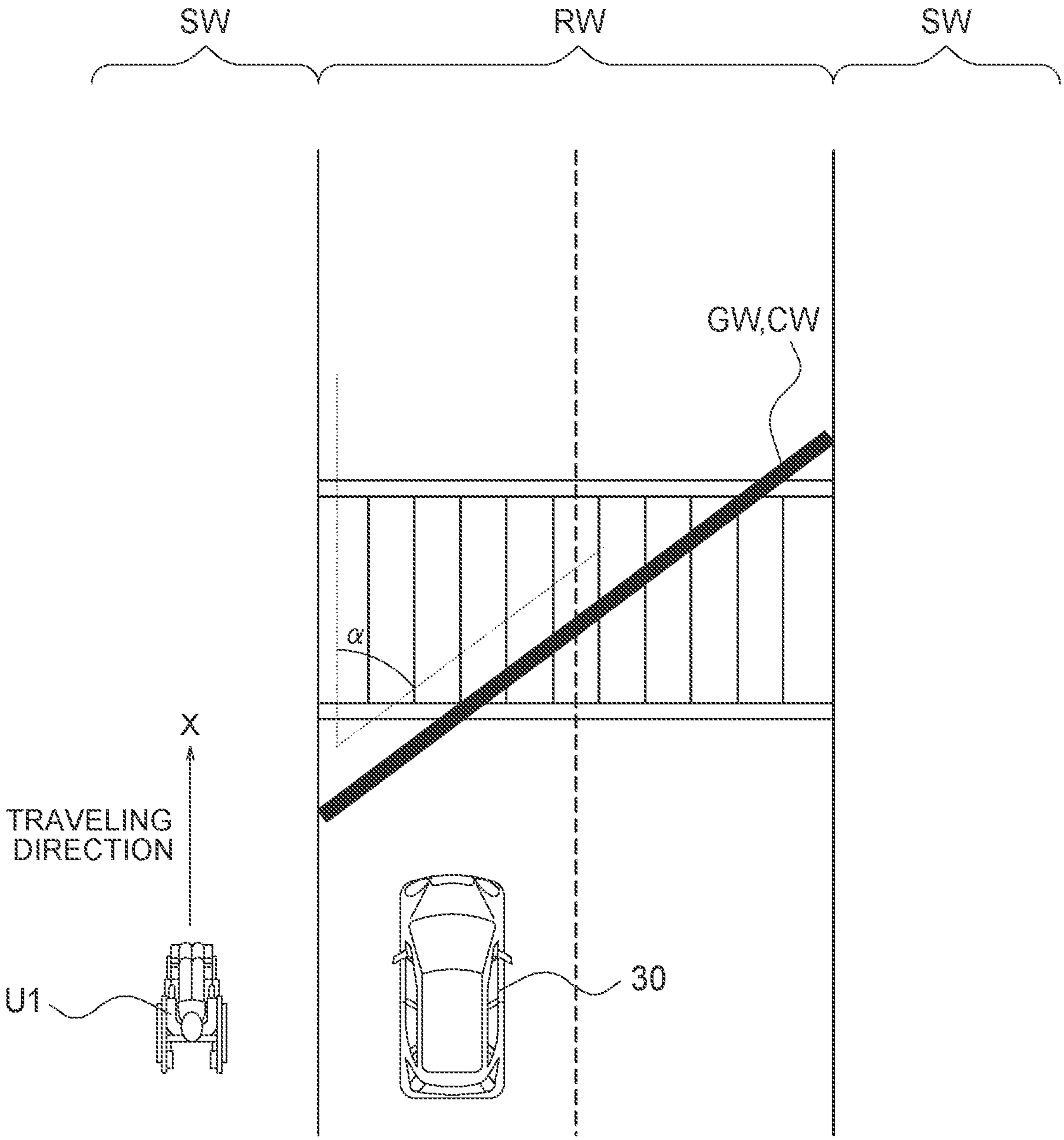
FIG. 7 is a schematic diagram showing yet another display example of the pedestrian crossing including the guideway according to the embodiment of the present disclosure.

FIG. 7 shows yet another display example of the pedestrian crossing CW and the guideway GW in the present embodiment. In this display example, the control unit 21 of the route control device 20 performs the control of displaying the pedestrian crossing CW including the guideway GW by superimposing the pedestrian crossing CW including the guideway GW on the pedestrian crossing provided to extend along the direction orthogonal to the roadway RW. Specifically, when there is already a pedestrian crossing on the roadway RW, the control unit 21 of the route control device 20 performs the control of displaying the pedestrian crossing CW including the guideway GW such that at least a part of the pedestrian crossing CW including the guideway GW overlaps the pedestrian crossing. For example, as shown in FIG. 7, consider a case where there is already a pedestrian crossing, on the roadway RW, extending in the direction orthogonal to the roadway RW. In this case, the control unit 21 performs the control of displaying, on the existing pedestrian crossing, the pedestrian crossing CW in the shape of the guideway GW as described with reference to FIG. 6, as the pedestrian crossing CW including the guideway GW. As a result, as shown in FIG. 7, the pedestrian crossing CW including the guideway GW is displayed by being superimposed on the existing pedestrian crossing. Alternatively, instead of displaying the pedestrian crossing CW in the shape of the guideway GW, the control unit 21 may define the area in which the guideway GW serves as a diagonal line and perform the control of displaying the pedestrian crossing CW in the shape of the defined area, as described with reference to FIG. 5. Further, as described with reference to FIG. 2, the control unit 21 may perform the control of displaying the shape of the guideway GW by superimposing the shape of the guideway GW on the pedestrian crossing CW.

According to this example, even when there is an existing pedestrian crossing, the wheelchair user U1 may cross the roadway RW following the indication of the pedestrian crossing CW including the guideway GW. Therefore, the wheelchair user U1 does not have to turn at a right angle in order to cross the existing pedestrian crossing. Thus, the burden on the wheelchair user crossing the roadway is reduced.

As described above, when the wheelchair user U1 who is about to cross the roadway RW is detected, the control unit 21 of the route control device 20 sets the angle $\alpha$ of the guideway GW for guiding the wheelchair user U1 with respect to the roadway RW in accordance with the length of the waiting time for which the vehicle 30 traveling on the roadway RW is kept waiting. The control unit 21 performs the control of displaying the pedestrian crossing CW including the guideway GW on the roadway RW.

According to the present embodiment, the burden on the wheelchair user U1 crossing the roadway RW is reduced.

In the present embodiment, the control unit 21 of the route control device may further provide one or more checkpoints on the guideway GW. The control unit 21 may notify the wheelchair user U1 of the timing at which the wheelchair user U1 should pass the checkpoint in order to complete crossing the roadway RW within the waiting time, for each of the one or more checkpoints. Specifically, the total length of the guideway GW is divided based on the length of the waiting time, and the division points are used as the checkpoints. The control unit 21 monitors the position of the wheelchair user U1, and when the wheelchair user U1 has not reached a checkpoint at the timing when the wheelchair user U1 should pass the checkpoint, the control unit notifies the wheelchair user U1 of the fact. For example, it is assumed that the total length of the guideway GW is 10 m. It is assumed that the length of the waiting time is 20 seconds. In this case, division points obtained by dividing 10 m into 20 are used as the checkpoints. That is, the checkpoint is provided every m. Further, the timing at which the wheelchair user U1 should pass the first checkpoint counting from the start point of the guideway GW is one second after the guideway GW is displayed. The timing at which the wheelchair user U1 should pass the second checkpoint counting from the start point of the guideway GW is two seconds after the guideway GW is displayed. That is, the timing at which the wheelchair user U1 should pass each checkpoint from the start point to the end point of the guideway GW is shifted every second in the order from the start point to the end point of the guideway GW. The control unit 21 monitors the position of the wheelchair user U1, and when the wheelchair user U1 has not reached a checkpoint at the timing when the wheelchair user U1 should pass the checkpoint, the control unit notifies the wheelchair user U1 of the fact. The timing at which the wheelchair user should pass the checkpoint may be notified to the wheelchair user U1 by any procedure, and for example, may be notified by the following procedure. When the wheelchair user U1 has not passed a checkpoint on the guideway GW and the time to pass the checkpoint approaches, the control unit 21 causes the light source corresponding to the checkpoint, among the light sources provided on the roadway RW, to blink. Alternatively, each time the wheelchair user U1 passes a checkpoint, the control unit 21 may notify the wheelchair user U1 of the timing at which the wheelchair user U1 should pass the checkpoint by causing an output device such as a speaker provided on the roadway RW to output, by voice, a message like "Passed the checkpoint on time." or "One second to the next checkpoint."

According to the present embodiment, it is possible to support the wheelchair user U1 such that the wheelchair user U1 can complete crossing the roadway RW within the time for which the guideway GW is displayed. Thus, the burden on the wheelchair user U1 crossing the roadway RW can be further reduced.

Figure 8:
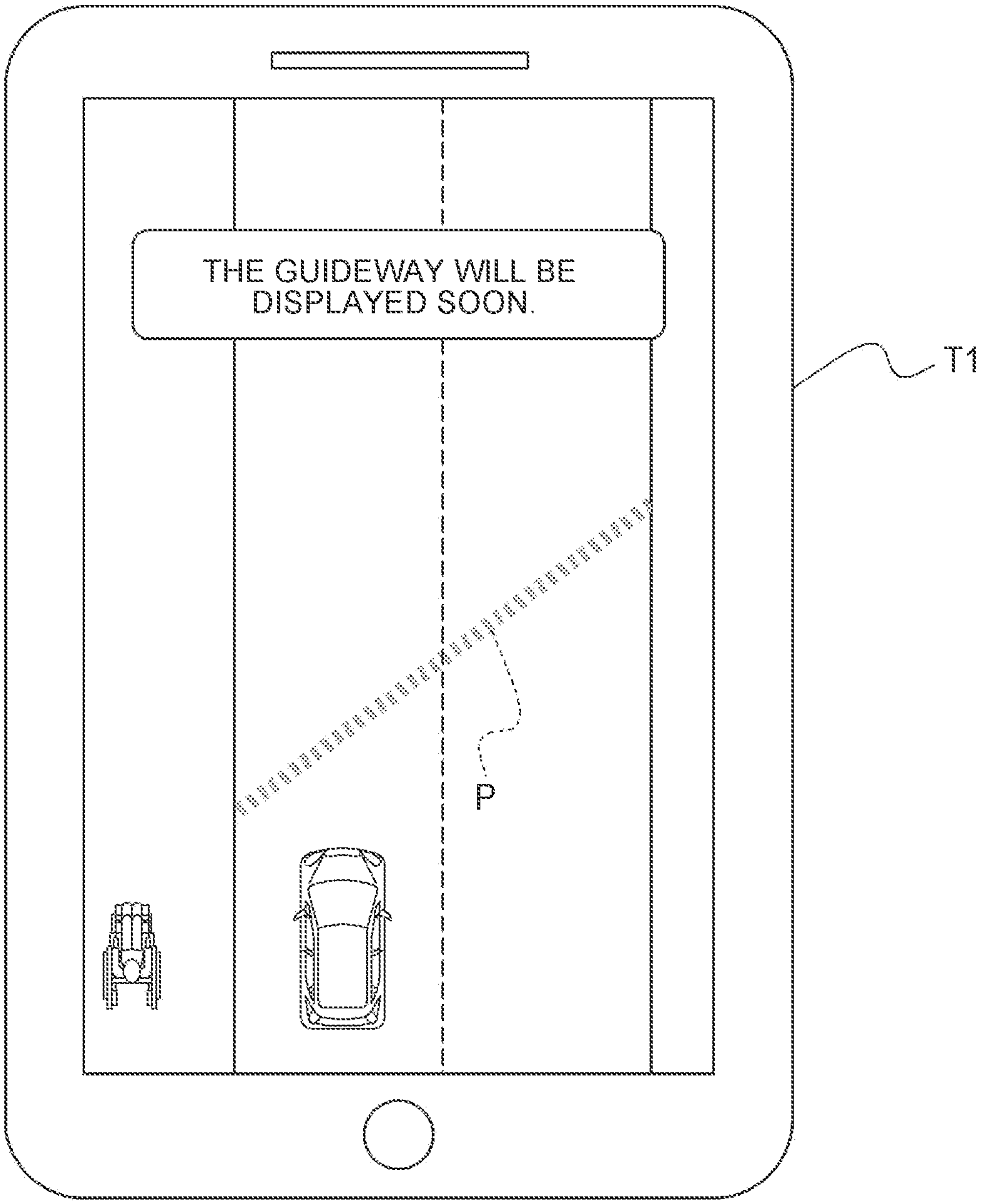
FIG. 8 is a schematic diagram showing a screen example of a terminal according to the embodiment of the present disclosure.
Figure 9:
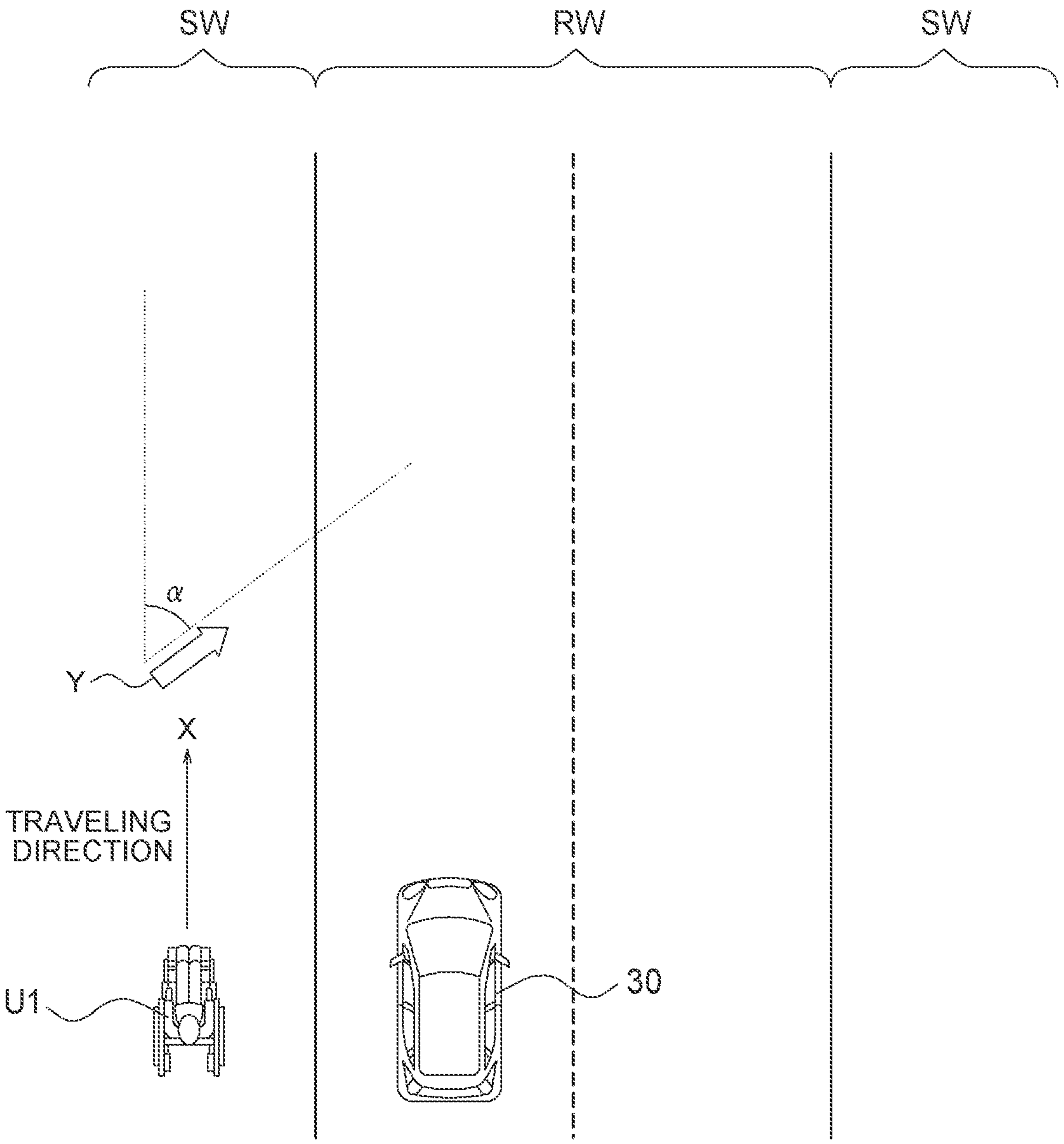
FIG. 9 is a schematic diagram showing a notification example of the pedestrian crossing including the guideway according to the embodiment of the present disclosure.

In the present embodiment, the control unit 21 of the route control device 20 may further notify the wheelchair user U1 of a display position P of the pedestrian crossing CW including the guideway GW before displaying the pedestrian crossing CW including the guideway GW. Specifically, the control unit 21 performs the control of displaying the extending direction of the guideway GW on the sidewalk SW as a notification of the display position P of the pedestrian crossing CW including the guideway GW. As an example, the control unit 21 may transmit an image showing the display position P of the pedestrian crossing CW including the guideway GW to the terminal T1 such as a smartphone of the wheelchair user U1. In this case, the terminal T1 that has received the data displays the received image on the screen of the terminal T1. For example, as shown in FIG. 8, an image showing the display position P of the pedestrian crossing CW including the guideway GW is displayed on the screen of the terminal T1 together with a message "The guideway will be displayed soon." Alternatively, instead of the image, the control unit 21 may transmit data indicating a map showing the display position P of the pedestrian crossing CW including the guideway GW to the terminal T1 such as a smartphone of the wheelchair user U1. In this case, the terminal T1 that has received the data displays the map indicated by the received data on the screen of the terminal T1. Alternatively, as shown in FIG. 9, the control unit 21 may notify the wheelchair user U1 of the display position P of the pedestrian crossing CW including the guideway GW, by causing the light sources provided on the sidewalk SW to light in the shape of an arrow Y that indicates the direction of the angle α of the guideway GW, at a position on the roadway RW that corresponds to the display position P of the guideway GW. The control unit 21 may perform the control of displaying the arrow Y on the roadway RW. Alternatively, the control unit 21 may cause a display such as a signage provided on the sidewalk SW to display the arrow Y. As a result, the wheelchair user U1 is notified of the display position P of the pedestrian crossing CW including the guideway GW.

According to the present modification, the wheelchair user U1 can know the display position P of the pedestrian crossing CW including the guideway GW in advance. Therefore, the wheelchair user U1 can prepare by turning to the direction of the guideway GW in advance. Thus, the burden on the wheelchair user U1 crossing the roadway RW can be further reduced.

The present disclosure is not limited to the embodiments described above. For example, two or more blocks shown in the block diagram may be integrated, or a single block may be divided. Instead of executing two or more steps shown in the flowchart in chronological order according to the description, the steps may be executed in parallel or in a different order, depending on the processing capacities of the devices that execute the steps, or as necessary. Other changes may be made without departing from the scope of the present disclosure.

What is claimed is:

1. A route control device comprising a control unit that sets an angle of a guideway for guiding a pedestrian with respect to a roadway in accordance with a length of a waiting time for which a vehicle traveling on the roadway is kept waiting, when the pedestrian who is about to cross the roadway is detected, and performs a control of displaying a pedestrian crossing including the guideway on the roadway.

2. The route control device according to claim 1, wherein the control unit sets the angle in accordance with a moving speed of the pedestrian.

3. The route control device according to claim 1, wherein the control unit sets the angle further in accordance with a width of the roadway.

4. The route control device according to claim 1, wherein when the roadway is located on a right side with respect to a traveling direction of the pedestrian, the control unit sets the angle within a range of more than 0° to 90° or less clockwise with an azimuth angle of the traveling direction set to 0°.

5. The route control device according to claim 1, wherein when the roadway is located on a left side with respect to a traveling direction of the pedestrian, the control unit sets the angle within a range of more than 0° to 90° or less counterclockwise with an azimuth angle of the traveling direction set to 0°.

6. The route control device according to claim 1, wherein the control unit performs a control of displaying the pedestrian crossing in a shape of the guideway.

7. The route control device according to claim 1, wherein the control unit defines an area in which the guideway serves as a diagonal line and performs a control of displaying the pedestrian crossing in a shape of the defined area.

8. The route control device according to claim 7, wherein the control unit performs a control of displaying a shape of the guideway by superimposing the shape of the guideway on the pedestrian crossing.

9. The route control device according to claim 1, wherein the control unit performs the control of displaying the pedestrian crossing including the guideway by superimposing the pedestrian crossing including the guideway on a pedestrian crossing provided to extend along a direction orthogonal to the roadway.

10. The route control device according to claim 1, wherein the control unit provides one or more checkpoints on the guideway and notifies, for each of the one or more checkpoints, the pedestrian of a timing at which the pedestrian is required to pass the each of the one or more checkpoints for completing crossing the roadway within the waiting time.

11. The route control device according to claim 1, wherein the control unit notifies the pedestrian of a display position of the pedestrian crossing including the guideway before displaying the pedestrian crossing including the guideway.

12. A route control method comprising:

setting, by a route control device, an angle of a guideway for guiding a pedestrian with respect to a roadway in accordance with a length of a waiting time for which a vehicle traveling on the roadway is kept waiting, when the pedestrian who is about to cross the roadway is detected; and performing, by the route control device, a control of displaying the pedestrian crossing including the guideway on the roadway.

13. The route control method according to claim 12, wherein setting the angle includes setting the angle further in accordance with a moving speed of the pedestrian, by the route control device.

14. The route control method according to claim 12, wherein setting the angle includes setting the angle further in accordance with a width of the roadway, by the route control device.

15. The route control method according to claim 12, wherein setting the angle includes setting, by the route control device, the angle within a range of more than 0° and 90° or less clockwise with an azimuth angle of a traveling direction set to 0°, when the roadway is located on a right side with respect to the traveling direction of the pedestrian.

16. The route control method according to claim 12, wherein setting the angle includes setting, by the route control device, the angle within a range of more than 0° and 90° or less counterclockwise with an azimuth angle of a traveling direction set to 0°, when the roadway is located on a left side with respect to the traveling direction of the pedestrian.

17. The route control method according to claim 12, wherein displaying the pedestrian crossing including the guideway on the roadway includes displaying the pedestrian crossing in a shape of the guideway.

18. The route control method according to claim 12, wherein displaying the pedestrian crossing including the guideway on the roadway includes defining an area in which the guideway serves as a diagonal line and displaying the pedestrian crossing in a shape of the defined area.

19. The route control method according to claim 12, wherein displaying the pedestrian crossing including the guideway on the roadway includes displaying the pedestrian crossing including the guideway by superimposing the pedestrian crossing including the guideway on a pedestrian crossing provided to extend along a direction orthogonal to the roadway.

20. The route control method according to claim 12, comprising:

providing, by the route control device, one or more checkpoints on the guideway; and notifying, for each of the one or more checkpoints, the pedestrian of a timing at which the pedestrian is required to pass the each of the one or more checkpoints for completing crossing the roadway within the waiting time, by the route control device.

* * * * *